United States Patent
Sonoda et al.

(10) Patent No.: US 7,948,587 B2
(45) Date of Patent: May 24, 2011

(54) LIQUID CRYSTAL DISPLAY DEVICE

(75) Inventors: Daisuke Sonoda, Chiba (JP); Takahiro Ochiai, Chiba (JP); Isao Suzumura, Edogawa (JP)

(73) Assignee: Hitachi Displays, Ltd., Chiba (JP)

( * ) Notice: Subject to any disclaimer, the term of this patent is extended or adjusted under 35 U.S.C. 154(b) by 74 days.

(21) Appl. No.: 12/203,966

(22) Filed: Sep. 4, 2008

(65) Prior Publication Data

US 2009/0073359 A1    Mar. 19, 2009

(30) Foreign Application Priority Data

Sep. 4, 2007    (JP) .................................. 2007-229091

(51) Int. Cl.
*G02F 1/1335*    (2006.01)
*G02F 1/1343*    (2006.01)
(52) U.S. Cl. .......................... 349/113; 349/114; 349/139
(58) Field of Classification Search .................. 349/113, 349/114, 139

See application file for complete search history.

(56) References Cited

U.S. PATENT DOCUMENTS

| 2002/0025391 A1* | 2/2002 | Angelopoulos et al. ........ 428/1.4 |
| 2002/0075423 A1 | 6/2002 | Fujino |
| 2005/0140871 A1* | 6/2005 | Hwang ........................... 349/114 |
| 2007/0126968 A1* | 6/2007 | Uochi ............................ 349/141 |
| 2008/0030663 A1* | 2/2008 | Igeta et al. .................... 349/114 |

FOREIGN PATENT DOCUMENTS

JP    11-305221    11/1999

* cited by examiner

*Primary Examiner* — Mark A Robinson
*Assistant Examiner* — Jerry Blevins
(74) *Attorney, Agent, or Firm* — Antonelli, Terry, Stout & Kraus, LLP.

(57) ABSTRACT

Reflective electrodes having unevenness are formed on a resin layer of a TFT substrate. A coating-type ITO film having a film thickness of 0.5 μm to 1 μm which constitute a pixel electrode is applied to the reflective electrode. A surface of the coating-type ITO film is leveled. A capacitive insulation film is formed on the pixel electrode, and a comb-teeth-shaped common electrode is formed on the capacitive insulation film. When a voltage is applied between the common electrode and the pixel electrode, liquid crystal is controlled by a leaked electric field. Since the common electrode is formed in a planar plane, a thickness of a liquid crystal layer can be made uniform.

22 Claims, 7 Drawing Sheets

US 7,948,587 B2

LIQUID CRYSTAL DISPLAY DEVICE

The present applications claims priority from Japanese applications JP2007-229091 filed on Sep. 4, 2007, the content of which is hereby incorporated by reference into this application.

BACKGROUND OF THE INVENTION

1. Field of the Invention

The present invention relates to a liquid crystal display device, and more particularly to a technique which can enhance a contrast of a reflective liquid crystal display device adopting an IPS system.

2. Description of the Related Art

With respect to a liquid crystal display device, a so-called transmissive liquid crystal display device which usually uses a backlight and controls light from the backlight using liquid crystal has been popularly used. On the other hand, with respect to a display device which is installed in a place where an external light always exists, with the use of a reflective liquid crystal display device which uses an external light, power necessary for the backlight can be saved. In using a mobile phone or the like outside, there may be a case that the transmissive liquid crystal display device mounted on the mobile phone or the like cannot acquire a sufficient contrast due to a strong external light. Accordingly, when the mobile phone or the like is used outside, there also has been a strong demand for the use of the reflective liquid crystal display device.

In the liquid crystal display device, liquid crystal is sandwiched between a color filter substrate on which color filters and the like are formed and a TFT substrate on which pixel electrodes, TFTs (thin film transistors) and the like are formed. Here, with respect to the reflective liquid crystal display device, reflective electrodes having unevenness which reflect an external light are formed on the TFT substrate and an image is formed by controlling the reflection light.

JP-A-2002-162646 (patent document 1) discloses a technique which simplifies a manufacturing process of the reflective liquid crystal display device by using a photoresist as a background insulation film for forming the unevenness on the reflective electrodes thus enhancing productivity. JP-A-11-305221 (patent document 2) discloses a technique which forms pixel electrodes as reflective electrodes and applies an insulation film to the pixel electrodes by coating for preventing lowering of contrast attributed to a fluctuation of a cell gap of a liquid crystal layer when unevenness is formed on the pixel electrodes, and a surface of the insulation film is leveled by chemical-mechanical polishing (CMP).

SUMMARY OF THE INVENTION

In the liquid crystal display device, a so-called viewing angle characteristic which makes contrast, hue or the like different depending on a viewing angle of a display is important. The liquid crystal display device of an IPS (In Plane Switching) system, controls liquid crystal based on electric fields generated in the direction parallel to the pixel electrodes and hence, this liquid crystal display device exhibits the excellent viewing angle characteristic. Although the IPS system has been popularly used in the transmissive liquid crystal display device conventionally, because of the excellent viewing angle characteristic, the IPS system has been also used in the reflective liquid crystal display device.

FIG. 7 is a plan view of a pixel portion of a reflective IPS liquid crystal display device. In FIG. 7, a cell is formed in a portion surrounded by data lines 50 and scanning lines 60. The cell is constituted of a pixel electrode 23 and a common electrode 21 which form an image, and a TFT which supplies an image signal to the pixel electrode 23. In FIG. 6, most of the cell is occupied by the pixel electrode 23 and the common electrode 21, and the TFT is formed on a lower side of the cell.

The TFT is constituted of a semiconductor layer 12, a gate electrode 14, a source/drain electrode 16 (SD electrode 16) and the like. In FIG. 7, although the gate electrode 14 is arranged on the semiconductor layer 12, the gate electrode 14 is formed by branching a portion of the scanning line 60. Further, out of the SD electrode 16, the data line 50 also functions as the source electrode. On the other hand, the drain electrode 16 is formed in a rectangular shape.

In FIG. 7, the pixel electrode 23 is formed in a comb-teeth shape. A common electrode 21 is formed in a planar shape below the pixel electrode 23 shown in FIG. 7. A reflective electrode 20 having unevenness is formed in an overlapping manner with the common electrode 21.

FIG. 8 is a cross-sectional view taken along a line A-A' in FIG. 7. In FIG. 8, a left side shows a TFT portion and a right side shows a pixel portion. Although the structure of the TFT portion is explained later, the whole TFT is protected by an inorganic passivation film 17 and a resin layer 18. The inorganic passivation film 17 and the resin layer 18 are also formed in the pixel portion. In the pixel portion, the unevenness is formed on a surface of the resin layer 18.

In FIG. 8, for connecting the drain electrode 16 of the TFT and the pixel electrode 23, a through hole is formed in the resin layer 18 and the inorganic passivation film 17. In the through hole portion, between the drain electrode 16 and the pixel electrode 23 which is connected with the drain electrode 16, a conductive film 211 which is formed on the same layer as the common electrode exists. However, the conductive film 211 and the common electrode 21 are not made conductive with each other.

On an organic passivation film having unevenness, reflective electrodes for reflecting an external light are formed. The reflective electrode has the two-layered structure, wherein the lower reflective electrode 19 is made of Mo or Mo alloy and the upper reflective electrode 20 is made of Al or Al alloy. Al possesses high reflectivity and hence, the upper layer which actually reflects an external light is made of Al.

A common electrode 21 made of ITO which constitutes a transparent electrode is formed on the reflective electrode. The common electrode 21 is formed in a planar shape. Being influenced by the unevenness of the reflective electrode, the unevenness is also formed on the common electrode 21. A capacitive insulation film 22 is formed on the common electrode 21, and the pixel electrode 23 is formed on the capacitive insulation film 22. With respect to the pixel electrode 23, only the comb-teeth portion is depicted. An alignment film 24 is applied to the pixel electrode 23 by coating, and a liquid crystal layer 25 is provided above the alignment film 24.

As shown in FIG. 8, the unevenness formed on the reflective electrode directly becomes the unevenness of the alignment film 24 and hence, a thickness of the liquid crystal layer 25 becomes different depending on places as indicated by d1, d2 shown in FIG. 8. The thickness of the liquid crystal layer 25 is set to an optimum value such that light can be effectively blocked when a black display is performed. However, with the constitution shown in FIG. 8, the thickness of the liquid crystal layer 25 differs depending on places. In this case, sinking of black differs depending on places and hence, a contrast differs depending on places. This difference in contrast deteriorates an image quality.

To level a surface of the alignment film 24 shown in FIG. 8, for example, the use of the technique described in patent document 2 may be considered. In the technique described in patent document 2, an insulation film is formed on a reflective electrode and an upper surface of the insulation film is leveled by chemical-mechanical polishing. To apply this technique to the structure shown in FIG. 8, a thickness of the capacitive insulation film 22 between the common electrode 21 and the pixel electrode 23 is increased and an upper surface of the capacitive insulation film 22 is formed by chemical-mechanical polishing.

However, such a constitution increases a distance between the common electrode 21 and the pixel electrode 23. In the liquid crystal display device of the IPS system shown in FIG. 8, a data signal is applied between the pixel electrode 23 and the common electrode 21, and liquid crystal molecules are controlled by a leaked electric field (a fringe electric field) generated between the pixel electrode 23 and the common electrode 21. Accordingly, when a thickness of the insulation film between the pixel electrode 23 and the common electrode 21 is increased, it is necessary to increase a signal voltage applied between the pixel electrode 23 and the common electrode 21. This increase of the signal voltage imposes a large burden on a data driver thus pushing up a manufacturing cost of the driver.

Further, even when the thickness of the capacitive insulation film 22 is increased and the surface of the capacitive insulation film 22 is leveled, the common electrode 21 is formed on the reflective electrode on which the unevenness is formed and hence, the unevenness is formed on the surface of the common electrode 21. On the other hand, the pixel electrode 23 is formed on the flat capacitive insulation film 22 and hence, the distance between the pixel electrode 23 and the common electrode 21 differs depending on the places. Accordingly, the fringe electric field leaked from between the pixel electrode 23 and the common electrode 21 differs depending on the places. As a result, even when the same voltage is applied between the pixel electrode 23 and the common electrode 21, the fringe electric field which controls the liquid crystal differs depending on the places. This implies that the contrast differs depending on the places. In this case, even when the thickness of the capacitive electrode is increased, and the pixel electrode 23 and the alignment film 24 are formed into a flat surface so that the cell gap of the liquid crystal is made uniform, the difference in contrast depending on places still exists.

Accordingly, it is an object of the present invention to enhance an image quality of a liquid crystal display device of an IPS system which can eliminate the difference in contrast depending on places in a reflective liquid crystal display device.

Followings are specific constitutions for achieving the above-mentioned object of the present invention.

(1) In a liquid crystal display device which sandwiches liquid crystal between a TFT substrate and a color filter substrate and forms an image by applying an electric field to the liquid crystal, data lines which extend in the first direction and are arranged parallel to each other in the second direction and scanning lines which extend in the second direction and are arranged parallel to each other in the first direction are formed on the TFT substrate, pixel portions are formed in portions which are surrounded by the data lines and the scanning lines, a reflective electrode having unevenness and a pixel electrode which is brought into contact with the reflective electrode are formed on the pixel portion, an insulation film is formed on the pixel electrode, a common electrode is formed on the insulation film, and a voltage is applied to the pixel electrode and the common electrode so as to control liquid crystal molecules, and the pixel electrode is formed of a coating-type transparent conductive film.

(2) In the liquid crystal display device having the above-mentioned constitution (1), the coating-type transparent conductive film is made of ITO.

(3) In the liquid crystal display device having the above-mentioned constitution (1), the coating-type transparent conductive film is made of ZnO.

(4) In the liquid crystal display device having the above-mentioned constitution (1), the coating-type transparent conductive film is made of poly-aniline or polyethylene-dihydroxy thiophene.

(5) In the liquid crystal display device having the above-mentioned constitution (1), the reflective electrode is formed of a two-layered metal film consisting of an upper-layer metal film and a lower-layer metal film, and both of the upper-layer metal film and the lower-layer metal film are in contact with the pixel electrode.

(6) In the liquid crystal display device having the above-mentioned constitution (5), the upper-layer metal film is made of Al or Al alloy and the lower-layer metal film is made of Mo or Mo alloy.

(7) In a liquid crystal display device which sandwiches liquid crystal between a TFT substrate and a color filter substrate and forms an image by applying an electric field to the liquid crystal, data lines which extend in the first direction and are arranged parallel to each other in the second direction and scanning lines which extend in the second direction and are arranged parallel to each other in the first direction are formed on the TFT substrate, pixel portions are formed in portions which are surrounded by the data lines and the scanning lines, a reflective electrode having unevenness and a common electrode which is brought into contact with the reflective electrode are formed on the pixel portion, an insulation film is formed on the common electrode, a pixel electrode is formed on the insulation film, and a voltage is applied to the pixel electrode and the common electrode so as to control liquid crystal molecules, and the common electrode is formed of a coating-type transparent conductive film.

(8) In the liquid crystal display device having the above-mentioned constitution (7), the coating-type transparent conductive film is made of ITO.

(9) In the liquid crystal display device having the above-mentioned constitution (7), the coating-type transparent conductive film is made of ZnO.

(10) In the liquid crystal display device having the above-mentioned constitution (7), the coating-type transparent conductive film is made of poly-aniline or polyethylene-dihydroxy thiophene.

(11) In the liquid crystal display device having the above-mentioned constitution (7), the reflective electrode is formed of a two-layered metal film consisting of an upper-layer metal film and a lower-layer metal film, and both of the upper-layer metal film and the lower-layer metal film are in contact with the pixel electrode.

(12) In the liquid crystal display device having the above-mentioned constitution (11), the upper-layer metal film is made of Al or Al alloy and the lower-layer metal film is made of Mo or Mo alloy.

(13) In a liquid crystal display device which sandwiches liquid crystal between a TFT substrate and a color filter substrate and forms an image by applying an electric field to the liquid crystal, wherein data lines which extend in the first direction and are arranged parallel to each other in the second direction and scanning lines which extend in the second direction and are arranged parallel to each other in the first direction are formed on the TFT substrate, and pixel portions are formed in portions which are surrounded by the data lines and the scanning lines, the pixel portions are constituted of: reflective pixel portions each of which includes a reflective electrode having unevenness, a pixel electrode which is brought into contact with the reflective electrode, an insulation film which is formed on the pixel electrode, and a common electrode which is formed on the insulation film, wherein a voltage is applied to the pixel electrode and the common electrode so as to control liquid crystal molecules; and transmissive pixel portions each of which includes a pixel electrode, an insulation film which is formed on the pixel electrode, and a common electrode which is formed on the insulation film, wherein a voltage is applied to the pixel electrode and the common electrode so as to control liquid crystal molecules, and the pixel electrode is formed of a coating-type transparent conductive film.

(14) In the liquid crystal display device having the above-mentioned constitution (13), the coating-type transparent conductive film is made of ITO.

(15) In the liquid crystal display device having the above-mentioned constitution (13), the reflective electrode is formed of a two-layered metal film consisting of an upper-layer metal film and a lower-layer metal film, and both of the upper-layer metal film and the lower-layer metal film are in contact with the pixel electrode.

(16) In a liquid crystal display device which sandwiches liquid crystal between a TFT substrate and a color filter substrate and forms an image by applying an electric field to the liquid crystal, data lines which extend in the first direction and are arranged parallel to each other in the second direction and scanning lines which extend in the second direction and are arranged parallel to each other in the first direction are formed on the TFT substrate, and pixel portions are formed in portions which are surrounded by the data lines and the scanning lines, the pixel portions are constituted of: reflective pixel portions each of which includes a reflective electrode having unevenness, a common electrode which is brought into contact with the reflective electrode, an insulation film which is formed on the common electrode, and a pixel electrode which is formed on the insulation film, wherein a voltage is applied to the pixel electrode and the common electrode so as to control liquid crystal molecules; and transmissive pixel portions each of which includes a common electrode, an insulation film which is formed on the common electrode, and a pixel electrode which is formed on the insulation film, wherein a voltage is applied to the pixel electrode and the common electrode so as to control liquid crystal molecules, and the common electrode is formed of a coating-type transparent conductive film.

(17) In the liquid crystal display device having the above-mentioned constitution (16), the coating-type transparent conductive film is made of ITO.

(18) In the liquid crystal display device having the above-mentioned constitution (16), the reflective electrode is formed of a two-layered metal film consisting of an upper-layer metal film and a lower-layer metal film, and both of the upper-layer metal film and the lower-layer metal film are in contact with the common electrode.

According to the present invention, in the liquid crystal display device of the IPS system which forms the pixel electrode on the reflective electrode having unevenness, forms the insulation film on the pixel electrode, and forms the common electrode on the insulation film, even when the reflective electrode is formed with unevenness, with the use of the coating-type transparent electrode as the pixel electrode, the surface of the pixel electrode can be leveled and hence, the insulation film and the common electrode formed on the pixel electrode and an alignment film formed on the common electrode can be leveled whereby a thickness of the liquid crystal layer can be made uniform. Accordingly, the liquid crystal display device of the IPS system can acquire an image having a high contrast.

Further, in the liquid crystal display device of the IPS system which forms the common electrode on the reflective electrode having unevenness, forms the insulation film on the common electrode, and forms the pixel electrode on the insulation film, with the use of the coating-type transparent conductive film as the common electrode, a thickness of the liquid crystal layer can be made uniform thus acquiring an image having a high contrast.

DESCRIPTION OF THE PREFERRED EMBODIMENTS

The present invention is explained in detail in conjunction with embodiments.

Embodiment 1

Figure 1:
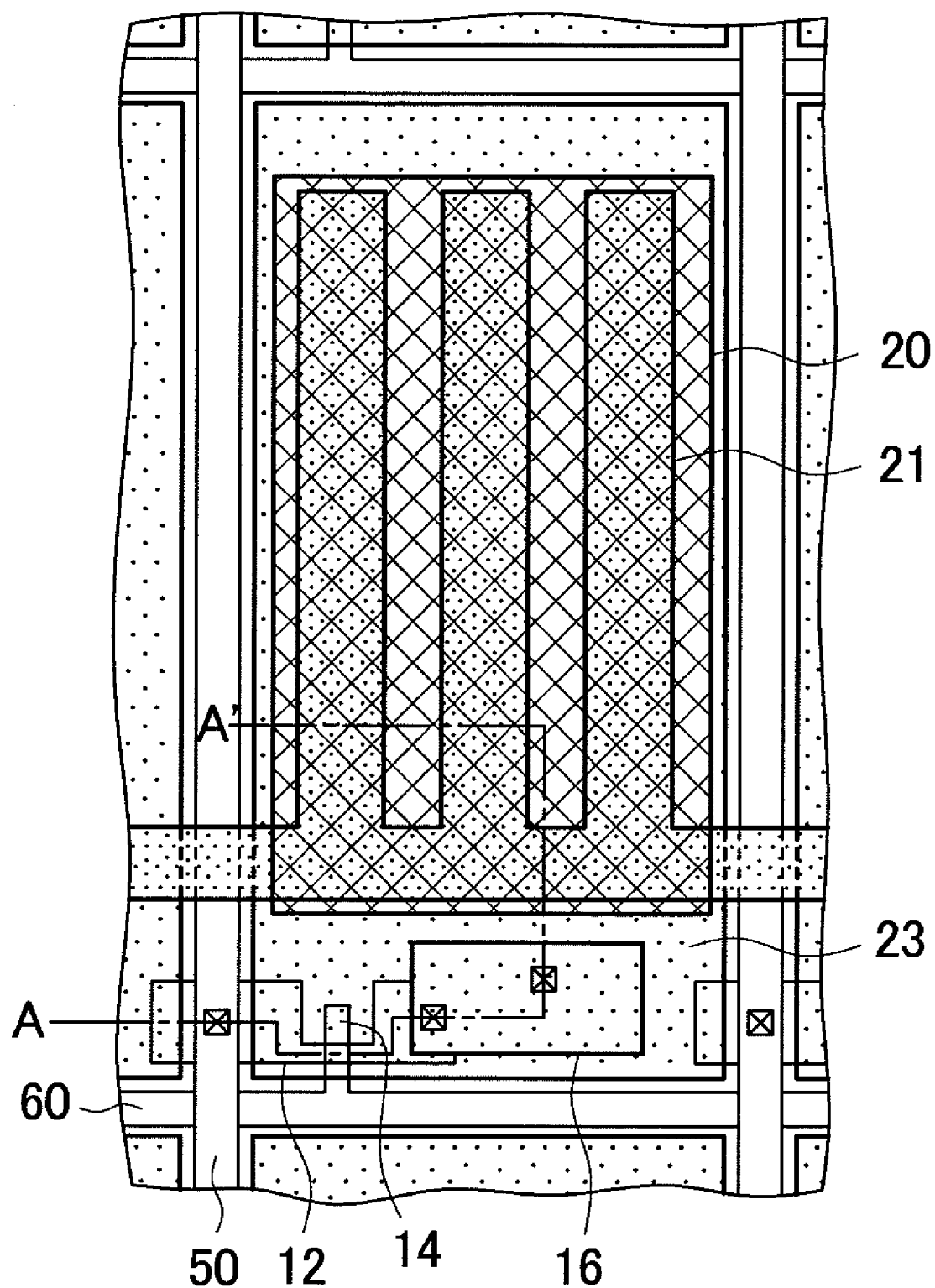
FIG. 1 is a plan view of a cell of a liquid crystal display device according to an embodiment 1 of the present invention.

FIG. 1 is a plan view of a cell of a liquid crystal display device according to the embodiment 1 of the present invention. In FIG. 1, a portion surrounded by data lines 50 and scanning lines 60 constitutes the cell. A most portion of the cell is occupied by a pixel portion. A TFT is formed on a lower side of the cell shown in FIG. 1. The TFT is constituted of a semiconductor layer 12, a gate electrode 14, a source/drain electrode 16 (SD electrode 16) and the like. The semiconductor layer 12 is made of polysilicon. Here, a-Si is converted into polysilicon by applying laser annealing to a-Si.

The gate electrode 14 is formed by branching a portion of the scanning lines 60. The data line 50 also functions as a source electrode connected with the semiconductor layer 12. The data line 50 and the semiconductor layer 12 are made conductive with each other by forming a through hole in an insulation layer sandwiched between the semiconductor layer 12 and the data line 50. The drain electrode 16 which is connected with the semiconductor layer 12 is a portion which is depicted in a rectangular shape in FIG. 1. The drain electrodes 16 are also formed on the same layer as the data lines 50 and are simultaneously formed with the formation of the data lines 50. The drain electrode 16 is also, in the same manner as the source electrode, made conductive with the semiconductor layer 12 by forming a through hole in an insulation layer between the semiconductor layer 12 and the data line 50. Hereinafter, the source electrode and the drain electrode 16 may be also collectively referred to as an SD electrode 16.

In FIG. 1, a pixel electrode 23 which is made of ITO and constitutes a transparent electrode is formed in a planar shape and covers the whole cell. That is, in this embodiment, the pixel electrode 23 covers not only the pixel portion but also the whole TFT portion. A through hole is formed in a passivation film formed between the pixel electrode 23 and the drain electrode 16 so as to establish the electric conduction between the pixel electrode 23 and the drain electrode 16. On the other hand, a reflective electrode is formed on the pixel portion of the cell. Unevenness is formed on the reflective electrode so as to reflect an external light uniformly in all directions. The reflective electrode is formed below the pixel electrode 23. Although the reflective electrode is formed of two-layered metal structure, only an upper reflective electrode 20 is shown in FIG. 1.

A comb-teeth-shaped common electrode 21 is formed on the planar pixel electrode 23 with an insulation film sandwiched therebetween. The common electrode 21 gets over the data line 50 and is made conductive with common electrodes 21 of both neighboring cells and is formed simultaneously with the common electrodes 21 of both neighboring cells. The common electrode 21 is also formed of a transparent conductive film made of ITO. When a voltage is applied between the pixel electrode 23 and the common electrode 21, a leaked electric field is generated between the pixel electrode 23 and the common electrode 21 and the leaked electric field particularly moves liquid crystal molecules between comb-teeth portions of the pixel electrode 23 thus controlling light which passes through the liquid crystal layer 25 whereby an image is formed.

Figure 2:
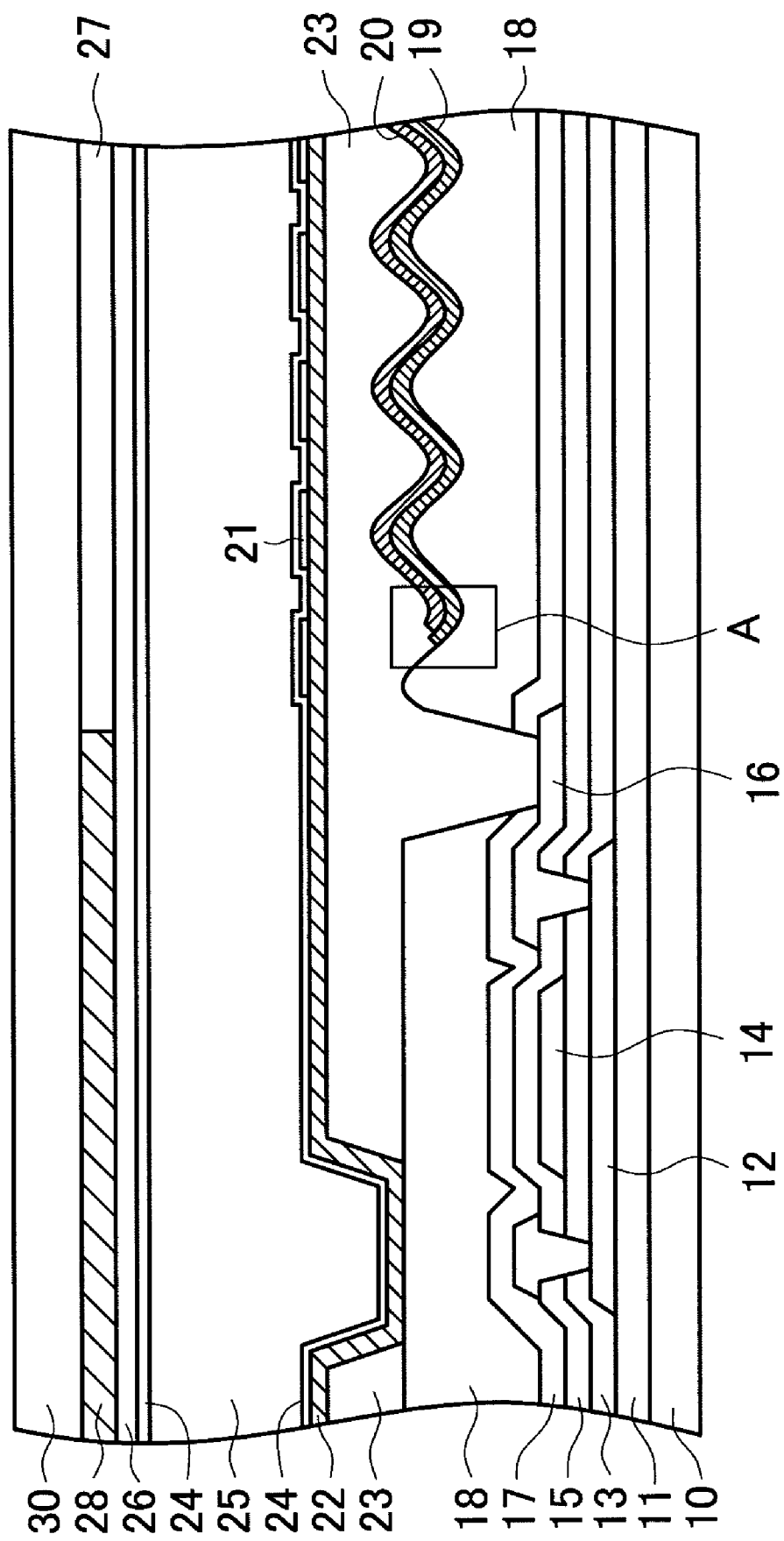
FIG. 2 is a cross-sectional view taken along a line A-A' in FIG. 1.

FIG. 2 is a cross-sectional view taken along a line A-A' in FIG. 1. The TFT is formed on a left side in FIG. 2. A background film 11 is formed on a TFT-side glass substrate 10. The background film 11 is provided for preventing impurities precipitated from the glass substrate from contaminating the semiconductor layer 12. The background film 11 may be formed of two-layered structure consisting of an SiN film and an $SiO_2$ film. The semiconductor layer 12 is formed on the background film 11. The semiconductor layer 12 is originally made of a-Si and, thereafter, a-Si is converted into polysilicon by laser annealing.

After forming the semiconductor layer 12 by patterning, a gate insulation film 13 made of $SiO_2$ is formed using TEOS (tetraethoxysilane). Thereafter, a gate electrode 14 is formed on the gate insulation film 13. The gate electrode 14 is formed by branching a portion of the scanning line 60. The gate electrodes 14 are formed simultaneously with the scanning lines 60. The gate electrode 14 is made of Mo or Mo alloy. Using the gate electrode 14 as a mask, the semiconductor layer 12 is doped with impurities such as phosphorus by ion implantation thus making a portion of the semiconductor layer 12 which is in contact with the SD electrode 16 conductive.

An interlayer insulation film 15 is formed using $SiO_2$ by a CVD method so as to cover the gate electrode 14. The interlayer insulation film 15 is provided for insulating the scanning lines 60 and the data lines 50 from each other. The data lines 50 or the SD electrodes 16 are formed on the interlayer insulation film 15. The data lines 50 or the SD electrodes 16 are made of a material which contains Al as a main component, wherein the Al layer is sandwiched between high-melting-metal layers made of Mo or the like. Mo or the like is used for preventing hillock of Al.

The TFT formed as described above is protected by an inorganic passivation film 17 and a resin layer 18. The inorganic passivation film 17 is formed using SiN, and the resin layer 18 is formed using acryl. The resin layer 18 is formed with a large thickness of approximately 2 to 3 μm and also plays a role of leveling a surface.

A right side in FIG. 2 shows the cross-sectional structure of the pixel portion. On the glass substrate, the background film 11, the gate insulation film 13, the interlayer insulation film 15, the inorganic passivation film 17 and the like are formed in the same manner as the TFT portion. In the same manner as the TFT portion, the resin layer 18 is formed on the inorganic passivation film 17. In the same manner as the resin layer 18 of the TFT portion, the resin layer 18 of the pixel portion is formed using acryl, and has a film thickness of 2 to 3 μm. Unevenness is formed on a surface of the resin layer 18 by photolithography. For example, the unevenness is formed such that resist having unevenness is formed on the resin layer 18, and the resist is etched from a surface thereof by dry etching thus forming the unevenness which traces the unevenness of the resist on the surface of the resin layer 18.

A reflective electrode is formed on the surface of the resin layer 18 on which the unevenness is formed. The reflective electrode adopts the two-layered structure. A lower reflective electrode 19 is formed using Mo or Mo alloy, and an upper reflective electrode 20 is formed using Al or Al alloy. Al possesses high reflectance. Accordingly, the upper reflective electrode 20 which actually reflects external light is formed using Al. The reason that the reflective electrode is formed of two-layered metal structure is as follows. That is, in this embodiment, an ITO film which constitutes a metal-oxide conductive film is formed on the reflective electrode by coating. When ITO and Al are brought into contact with each other, an oxide film is formed on a surface of Al thus preventing the ITO film and Al which constitutes the reflective electrode from becoming conductive with each other. When such conduction between the ITO film and Al is not acquired, the reflective electrode electrically floats, and this floating of the reflective electrode may influence the behavior of liquid crystal. Accordingly, by forming the Mo film on a lower side of Al and by bringing Mo into contact with the ITO film, the conduction between the reflective electrode and the pixel electrode 23 is acquired.

Figure 3:
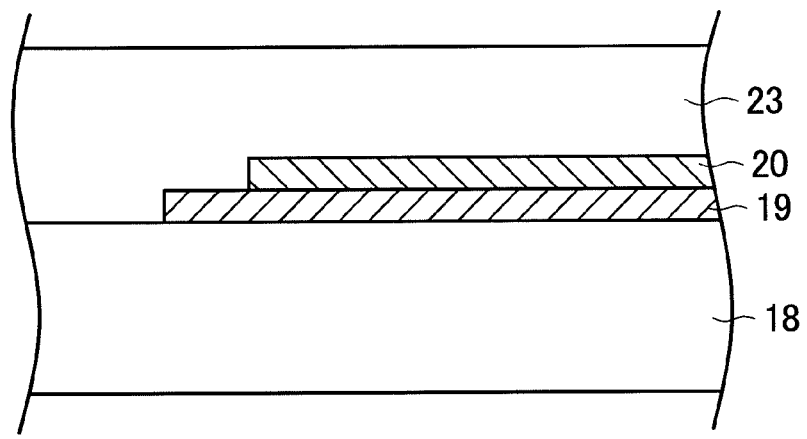
FIG. 3 is an enlarged view of a portion A in FIG. 2.

FIG. 3 is an enlarged view of a portion A shown in FIG. 2. FIG. 3 is a schematic cross-sectional view showing an end portion of the reflective electrode. In FIG. 3, the lower reflective electrode 19 made of Mo and the upper reflective electrode 20 made of Al are formed on the resin layer 18. The upper reflective electrode 20 and the lower reflective electrode 19 are covered with the ITO film which constitutes the pixel electrode 23. The lower reflective electrode 19 is formed slightly larger than the upper reflective electrode 20, and has an end portion thereof brought into contact with the ITO film which constitutes the pixel electrode 23. The Al film which constitutes the upper reflective electrode 20 is brought into contact with the ITO film which constitutes the pixel electrode 23 over a large area thereof. However, Al is oxidized by ITO thus forming alumina on a surface thereof and hence, after a lapse of long time, a contact between the ITO film which constitutes the pixel electrode 23 and Al becomes unstable. To prevent such an unstable contact between the ITO film and Al, Mo is exposed at the end portion of the reflective electrode for bringing Mo into contact with the ITO film which constitutes the pixel electrode 23 thus preventing the reflective electrode from electrically floating.

In FIG. 2, the ITO film which constitutes the pixel electrode 23 is formed with a large thickness by coating. A film thickness of the ITO film formed by coating is 0.5 μm to 1 μm. The ITO film is formed with the large thickness by coating so as to level a surface of the ITO film. By forming the ITO film by spin coating or slit coating, it is possible to form a film having a flat surface. Here, a coating-type ITO film is commercially available. In this embodiment, the coating-type ITO film is used for forming the pixel electrode 23. However, a material used for forming the pixel electrode 23 is not limited to the coating-type ITO film, and an organic conductive material such as poly-aniline or polyethylene-dihydroxy-thiophene, coating-type ZnO or the like can be used.

After forming the coating-type ITO film in this manner, the pixel electrodes 23 formed of a coating-type ITO film is formed by patterning using photolithography. The pixel electrode 23 is made conductive with the SD electrode 16 via a through hole formed in the inorganic passivation film 17 and the resin layer 18. On the pixel electrode 23 which is leveled in this manner, a capacitive insulation film 22 is formed using SiN. Since an upper surface of the pixel electrode 23 is leveled, the capacitive insulation film 22 is also leveled.

A comb-teeth-shaped common electrode 21 is formed on the capacitive insulation film 22. The comb-teeth-shaped common electrode 21 is formed of the ITO film which constitutes a transparent conductive film. The ITO film which constitutes the common electrode 21 is formed by sputtering. An alignment film 24 for aligning the liquid crystal is applied by coating so as to cover the common electrode 21. A liquid crystal layer 25 is sealed between the alignment film 24 formed on the TFT substrate and the alignment film 24 formed on the color filter substrate.

With respect to the color filter substrate, a color filter 27 is formed on a portion of the color-filter-side glass substrate 30 which corresponds to the pixel portion of the TFT substrate. A black matrix 28 (BM) which contributes to the enhancement of the contrast of an image is formed between the color filters 27, 27. An over-coating film 26 is formed so as to cover the color filter 27 and the BM thus leveling a surface thereof. The alignment film 24 is formed on the leveled over-coating film 26 by coating.

In this embodiment, the common electrodes 21 can be formed on the leveled capacitive insulation film 22. Accordingly, the alignment film 24 formed on the TFT substrate is also leveled and hence, a thickness of the liquid crystal layer 25 sealed between the TFT substrate and the color filter substrate is made uniform. Here, the comb-teeth-shaped common electrode 21 has a film thickness of approximately 70 nm and hence, the influence of the common electrode 21 on the thickness of the liquid crystal layer 25 can be ignored. Accordingly, the thickness of the liquid crystal layer 25 can be set to a value at which the highest contrast is obtained and hence, it is possible to perform an image display with high image quality.

Embodiment 2

Figure 4:
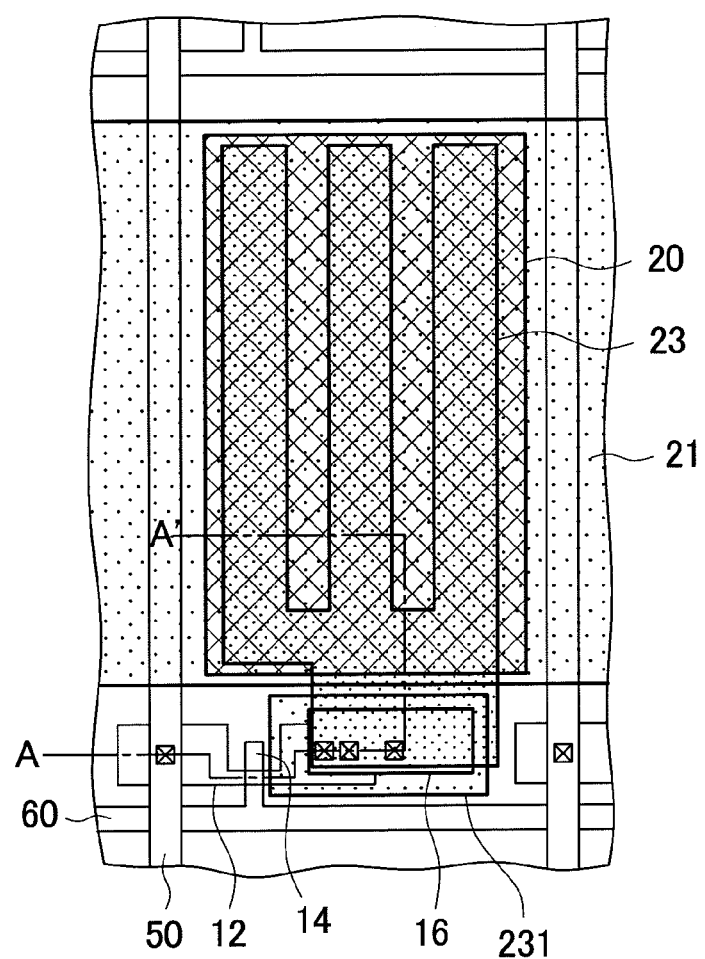
FIG. 4 is a plan view of a cell of a liquid crystal display device according to an embodiment 2 of the present invention.

FIG. 4 is a plan view of a cell portion of a liquid crystal display device according to an embodiment 2 of the present invention. In FIG. 4, a cell is formed in a region which is surrounded by data lines 50 and scanning lines 60. Most of the cell is occupied by a pixel portion and a TFT portion is formed below the pixel portion. Since the constitution of the TFT portion is substantially equal to the constitution of the TFT portion of the embodiment 1, the explanation of the constitution of the TFT portion is omitted.

In FIG. 4, a comb-teeth-shaped pixel electrode 23 is positioned at an uppermost layer. Here, an alignment film 24 is omitted in FIG. 4. The pixel electrode 23 is connected with an SD electrode 16 of the TFT via a through hole formed in an inorganic passivation film 17 and a resin layer 18. A common electrode 21 is formed below the comb-teeth-shaped pixel electrode 23 in a planer shape by way of a capacitive insulation film 22. The common electrode 21 is formed in a laterally elongated stripe shape so as to be formed in common among the cell and neighboring cells. A reflective electrode is formed below the common electrode 21.

Figure 5:
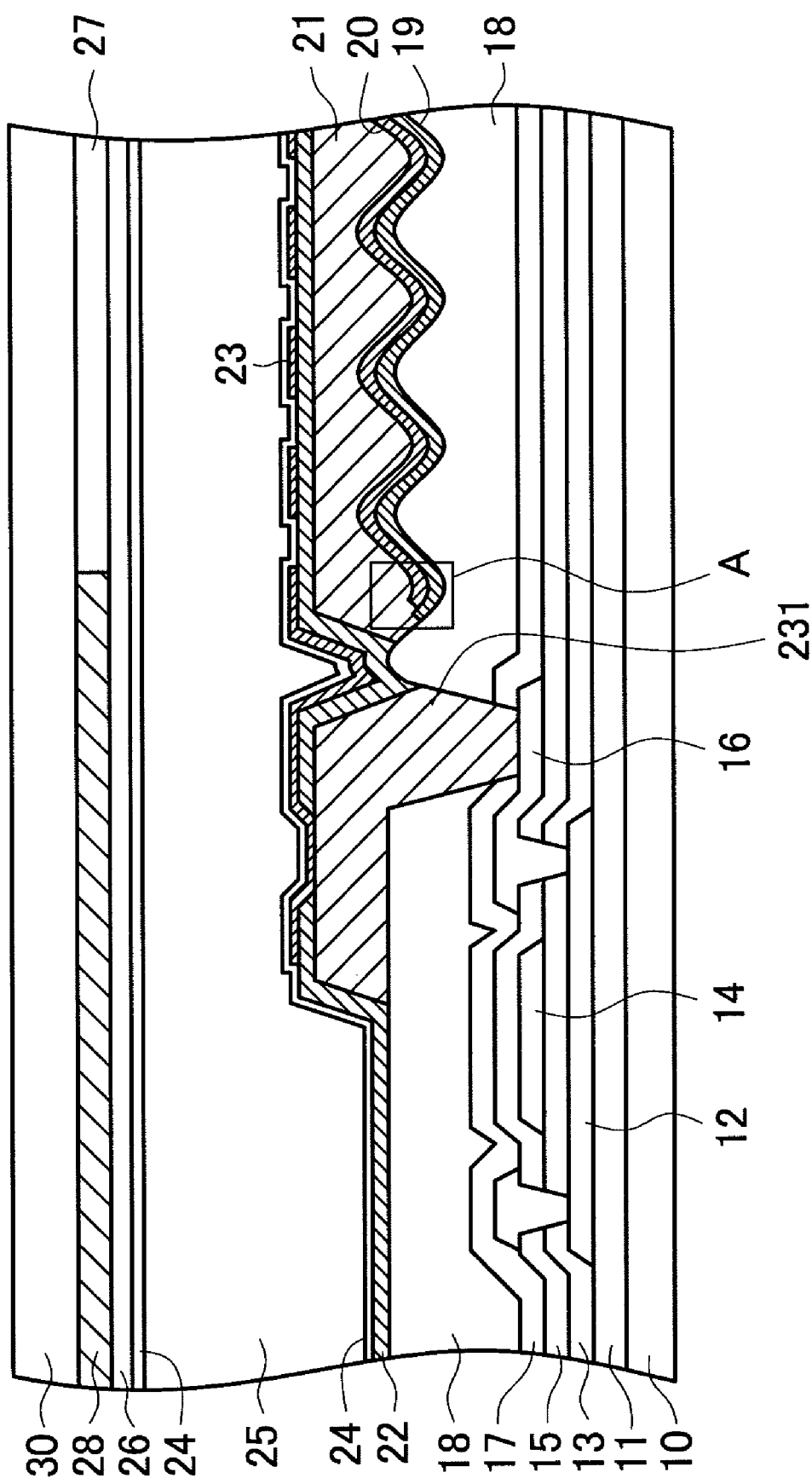
FIG. 5 is a cross-sectional view taken along a line A-A' in FIG. 4.

FIG. 5 is a cross-sectional view taken along a line A-A' in FIG. 4. The left side of FIG. 5 shows the TFT portion. Since the constitution of the TFT portion is substantially equal to the constitution of the TFT portion of the embodiment 1, the explanation of the constitution of the TFT portion is omitted. The right side of FIG. 5 shows the cross-sectional structure of the pixel portion. Also in this embodiment, in the same manner as the embodiment 1, a background film 11, a gate insulation film 13, an interlayer insulation film 15, an inorganic passivation film 17 and a resin layer 18 are formed in this order on a TFT-side glass substrate 10.

Also in this embodiment, unevenness for improving the reflection characteristic is formed on a surface of the resin layer 18. A method of forming the unevenness is substantially equal to the method of forming the unevenness of the embodiment 1. In the same manner as the embodiment 1, on the resin layer 18 on which the unevenness are formed, a lower reflective electrode 19 made of Mo or Mo alloy and an upper reflective electrode 20 made of Al or Al alloy are formed. Different from the embodiment 1, the common electrode 21 is formed on an upper reflective electrode 20 in this embodiment. However, in the same manner as the pixel electrode 23 of the embodiment 1, the common electrode 21 of this embodiment is also formed of a coating-type ITO film.

In this embodiment, the reflective electrode is connected with the common electrode 21. Since the common electrode 21 of this embodiment is also formed of a coating-type ITO film, in the same manner as the embodiment 1, a surface of an Al film which constitutes an upper reflective electrode 20 is also oxidized by ITO. Accordingly, an end portion of the reflective electrode has the substantially same structure as the end portion of the reflective electrode of the embodiment 1. A portion A shown in FIG. 5 has the same basic structure as the portion A of the embodiment 1 shown in FIG. 3. In FIG. 3, in this embodiment, the pixel electrode 23 is not brought into contact with the reflective electrode but the common electrode 21 is brought into contact with the reflective electrode.

In FIG. 5, the common electrode 21 formed on the reflective electrode is formed of a coating-type ITO film so that an upper surface of the common electrode 21 is leveled. Accordingly, the coating-type ITO film has a large coating thickness of 0.5 μm to 1 μm. In this embodiment, although the common electrode 21 is formed of the coating-type ITO film, in the same manner as the embodiment 1, a material of the common electrode 21 is not limited to the coating-type ITO film, and the common electrode 21 may be made of an organic conductive material such as poly-aniline, polyethylene-dihydroxy-thiophene, coating-type ZnO or the like.

A capacitive insulation film 22 is formed on the leveled common electrode 21 using SiN. The film thickness of the capacitive insulation film 22 is set to 200 nm to 300 nm. A comb-teeth-shaped pixel electrode 23 is formed on the capacitive insulation film 22. An alignment film 24 is formed on the comb-teeth-shaped pixel electrode 23 by coating.

Since an upper surface of the common electrode 21 is leveled, respective surfaces of the capacitive insulation film 22, the pixel electrode 23 and the alignment film 24 formed on the common electrode 21 are also leveled. Accordingly, a thickness of a liquid crystal layer 25 can be also made uniform. Here, a film thickness of the comb-teeth-shaped pixel electrode 23 is set to approximately 70 nm and hence, the influence of the thickness of the pixel electrode 23 on the thickness of the liquid crystal layer 25 can be ignored.

In FIG. 5, the pixel electrode 23 is connected with a drain electrode 16 of the TFT. The connection between the drain electrode 16 and the pixel electrode 23 adopts the following structure. A through hole is formed in the inorganic passivation film 17 and the resin layer 18, and a connection electrode 231 is formed of a coating-type ITO film. The connection electrode 231 is formed of the same coating-type ITO film as the common electrode 21 and is formed simultaneously with the formation of the common electrode 21. Then, the connection electrode 231 is separated from the common electrode 21 using photolithography.

After separating the common electrode 21 and the connection electrode 231 from each other, a capacitive insulation film 22 is formed so as to ensure the electrical insulation between the connection electrode 231 and the common electrode 21. A through hole is formed in the capacitive insulation film 22 formed on the connection electrode 231. Via this through hole, the pixel electrode 23 is connected with the connection electrode 231 and eventually with the drain layer of the TFT. In FIG. 5, although the pixel electrodes 23 appears to be formed with a gap therebetween, this is because that FIG. 5 depicts the cross-sections of teeth portions of the comb-teeth-shaped electrode, and the pixel electrode 23 is actually formed as an integral one piece. Here, the constitution of a color filter substrate which sandwiches liquid crystal with the TFT substrate is substantially similar to the constitution of the color filter substrate of the embodiment 1 and hence, the explanation of the color filter substrate is omitted.

As described heretofore, also in the arrangement in which the common electrode 21 is arranged below the pixel electrode 23, the surface of the pixel electrode 23 can be leveled and hence, it is possible to make a thickness of the liquid crystal layer 25 uniform. Accordingly, also in this embodiment, it is possible to uniformly set the thickness of the liquid crystal layer 25 with which the maximum contrast can be obtained. Accordingly, the liquid crystal display device according to this embodiment can acquire a high quality image.

Embodiment 3

The embodiment 1 and the embodiment 2 are directed to the reflective liquid crystal display device. In applications such as a mobile phone or the like, there exists a demand for the use of a liquid crystal display device which can perform a transmissive-type display indoors and a reflective-type display outdoors where an external light is strong. In such a case, a cell surrounded by data lines 50 and scanning lines 60 is divided in two for performing the transmissive-type display and the reflective-type display. Also the liquid crystal display device having such constitution, the present invention is applicable to the reflective portion.

Figure 6:
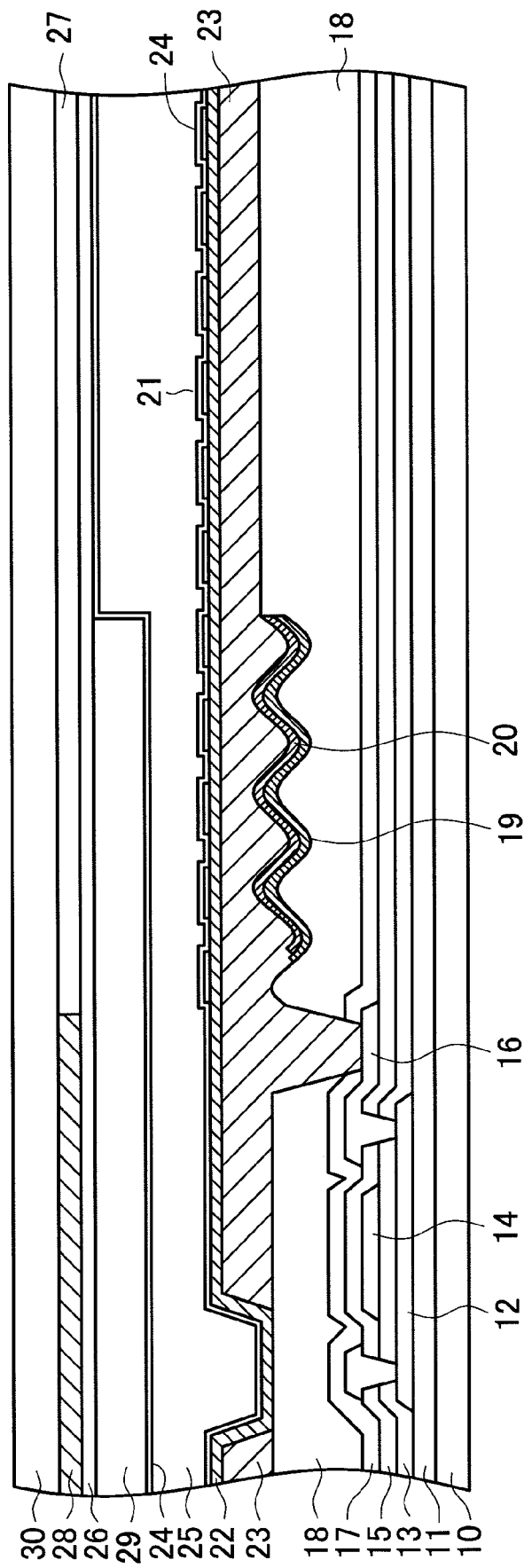
FIG. 6 is a cross-sectional view of a cell of a liquid crystal display device according to an embodiment 3 of the present invention.
Figure 7:
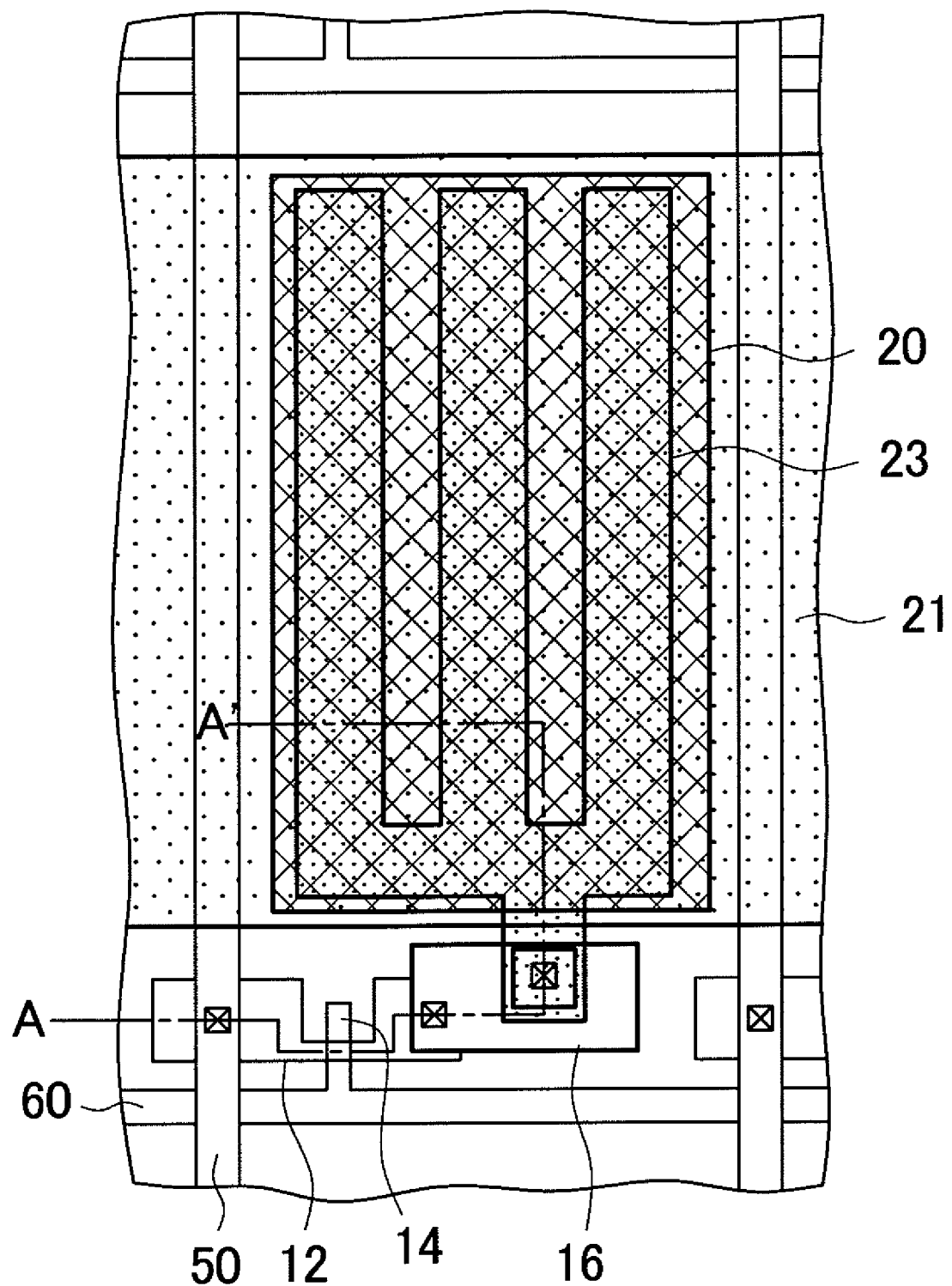
FIG. 7 is a plan view of a cell of a conventional liquid crystal display device.
Figure 8:
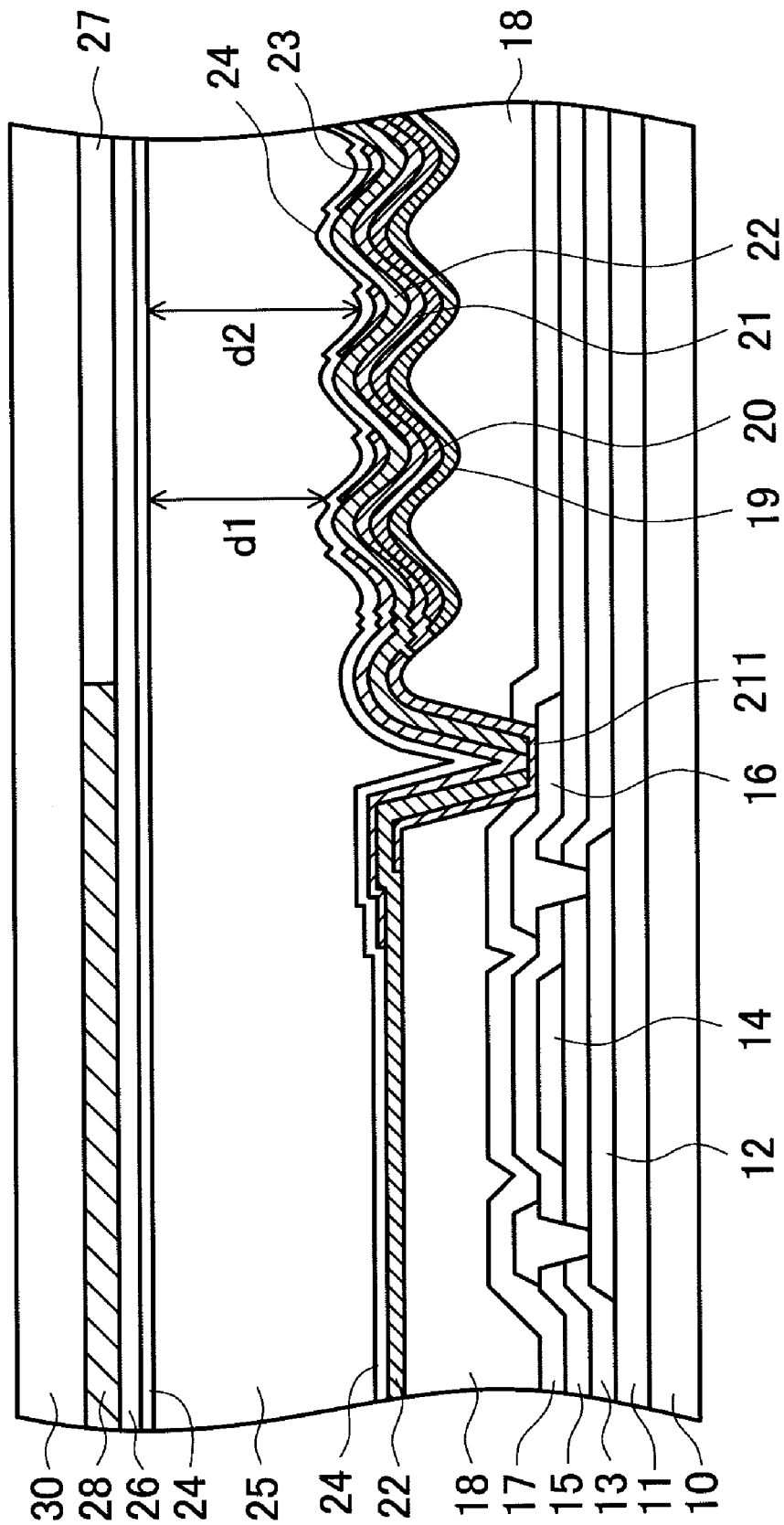
FIG. 8 is a cross-sectional view taken along a line A-A' in FIG. 7.

FIG. 6 is a schematic cross-sectional view of a cell of this embodiment. In FIG. 6, a reflective pixel portion is arranged on a portion of the cell close to a TFT portion and a transmissive pixel portion is arranged on a portion of the cell remote from the TFT. The reflective pixel portion has the substantially same constitution as the reflective pixel portion of the embodiment 1, a pixel electrode 23 is arranged below a capacitive insulation film, and a common electrode 21 is formed on the capacitive insulation film 22.

The transmissive pixel portion has basically the same structure as the reflective pixel portion. However, in the transmissive pixel portion, no reflective electrode is formed. Accordingly, light radiated from a backlight can pass through the transmissive pixel electrode and, by controlling the transmissive light using liquid crystal, it is possible to form a transmissive image.

In the reflective portion, it is necessary to set a thickness of the liquid crystal layer 25 to half of the thickness of the liquid crystal layer of the transmissive portion. This is because an external light which forms an image passes the liquid crystal twice in the reflective portion and hence, it is necessary to make the retardation attributed to the pixel portion and the liquid crystal of the reflective portion agree with the retardation attributed to the pixel portion and the liquid crystal of the transmissive portion. For this end, in the reflective portion, by providing a space adjusting layer 29, a thickness of the liquid crystal layer 25 in the reflective portion is adjusted to half of the thickness of liquid crystal layer 25 in the transmissive portion. To adjust the extremely small difference in retardation between the reflective pixel portion and the transmissive pixel portion, a phase difference plate may be arranged on the reflective pixel portion or the transmissive pixel portion.

In this embodiment, the reflective pixel portion adopts the constitution of the reflective pixel portion of the embodiment 1. However, it is needless to say that the reflective pixel portion may adopt the constitution of the reflective pixel portion of the embodiment 2. In this embodiment, basically, the transmissive portion and the reflective portion can be formed using the same process. That is, although the transmissive pixel portion and the reflective pixel portion differ from each other in some portions, such difference may be covered by changing masks used in photolithography. In this manner, according to this embodiment, a high quality image can be obtained in either a case which uses the liquid crystal display device as a reflective liquid crystal display device or a case which uses the liquid crystal display device as a transmissive liquid crystal display device.

What is claimed is:

1. A liquid crystal display device which sandwiches liquid crystal between a TFT substrate and a color filter substrate and forms an image by applying an electric field to the liquid crystal, wherein data lines which extend in the first direction and are arranged parallel to each other in the second direction and scanning lines which extend in the second direction and are arranged parallel to each other in the first direction are formed on the TFT substrate, and pixel portions are formed in portions which are surrounded by the data lines and the scanning lines, the pixel portions are constituted of:

reflective pixel portions each of which includes a reflective electrode having unevenness, a pixel electrode which is brought into contact with the reflective electrode, an insulation film which is formed on the pixel electrode, and a common electrode which is formed on the insulation film, wherein a voltage is applied to the pixel electrode and the common electrode so as to control liquid crystal molecules; and transmissive pixel portions each of which includes a pixel electrode, an insulation film which is formed on the pixel electrode, and a common electrode which is formed on the insulation film, wherein a voltage is applied to the pixel electrode and the common electrode so as to control liquid crystal molecules, and the pixel electrode which is brought into contact with the reflective electrode having the unevenness is formed of a coating-type transparent conductive film so that a surface of the pixel electrode facing the liquid crystal at least in a region of the reflective electrode facing the liquid crystal is substantially level without the unevenness of the reflective electrode.

2. A liquid crystal display device according to claim 1, wherein the coating-type transparent conductive film is made of ITO.

3. A liquid crystal display device according to claim 1, wherein the reflective electrode is formed of a two-layered metal film consisting of an upper-layer metal film and a lower-layer metal film, and both of the upper-layer metal film and the lower-layer metal film are in contact with the pixel electrode.

4. A liquid crystal display device according to claim 1, wherein a cell gap of the liquid crystal between the TFT substrate and the color filter substrate in the region of the reflective electrode is substantially uniform.

5. A liquid crystal display device which sandwiches liquid crystal between a TFT substrate and a color filter substrate and forms an image by applying an electric field to the liquid crystal, wherein data lines which extend in the first direction and are arranged parallel to each other in the second direction and scanning lines which extend in the second direction and are arranged parallel to each other in the first direction are formed on the TFT substrate, and pixel portions are formed in portions which are surrounded by the data lines and the scanning lines, the pixel portions are constituted of:

reflective pixel portions each of which includes a reflective electrode having unevenness, a common electrode which is brought into contact with the reflective electrode, an insulation film which is formed on the common electrode, and a pixel electrode which is formed on the insulation film, wherein a voltage is applied to the pixel electrode and the common electrode so as to control liquid crystal molecules; and transmissive pixel portions each of which includes a common electrode, an insulation film which is formed on the common electrode, and a pixel electrode which is formed on the insulation film, wherein a voltage is applied to the pixel electrode and the common electrode so as to control liquid crystal molecules, and the common electrode which is brought into contact with the reflective electrode having the unevenness is formed of a coating-type transparent conductive film so that a surface of the common electrode facing the liquid crystal at least in a region of the reflective electrode facing the liquid crystal is substantially level without the unevenness of the reflective electrode.

6. A liquid crystal display device according to claim 5, wherein the coating-type transparent conductive film is made of ITO.

7. A liquid crystal display device according to claim 5, wherein the reflective electrode is formed of a two-layered metal film consisting of an upper-layer metal film and a lower-layer metal film, and both of the upper-layer metal film and the lower-layer metal film are in contact with the common electrode.

8. A liquid crystal display device according to claim 5, wherein a cell gap of the liquid crystal between the TFT substrate and the color filter substrate in the region of the reflective electrode is substantially uniform.

9. A liquid crystal display device which sandwiches liquid crystal between a TFT substrate and a color filter substrate and forms an image by applying an electric field to the liquid crystal; wherein data lines which extend in the first direction and are arranged parallel to each other in the second direction and scanning lines which extend in the second direction and are arranged parallel to each other in the first direction are formed on the TFT substrate, pixel portions are formed in portions which are surrounded by the data lines and the scanning lines, a reflective electrode having unevenness and a pixel electrode which is brought into contact with the reflective electrode are formed on the pixel portion, an insulation film is formed on the pixel electrode, a common electrode is formed on the insulation film, and a voltage is applied to the pixel electrode and the common electrode so as to control liquid crystal molecules;

the pixel electrode is formed of a coating-type transparent conductive film; and the pixel electrode which is brought into contact with the reflective electrode having the unevenness is formed of the coating-type transparent conductive film so that a surface of the pixel electrode facing the liquid crystal in a region of the reflective electrode facing the liquid crystal is substantially level without the unevenness of the reflective electrode.

10. A liquid crystal display device according to claim 9, wherein the coating-type transparent conductive film is made of ITO.

11. A liquid crystal display device according to claim 9, wherein the coating-type transparent conductive film is made of ZnO.

12. A liquid crystal display device according to claim 9, wherein the coating-type transparent conductive film is made of poly-aniline or polyethylene-dihydroxy-thiophene.

13. A liquid crystal display device according to claim 9, wherein the reflective electrode is formed of a two-layered metal film consisting of an upper-layer metal film and a lower-layer metal film, and both of the upper-layer metal film and the lower-layer metal film are in contact with the pixel electrode.

14. A liquid crystal display device according to claim 13, wherein the upper-layer metal film is made of Al or Al alloy and the lower-layer metal film is made of Mo or Mo alloy.

15. A liquid crystal display device according to claim 9, wherein a cell gap of the liquid crystal between the TFT substrate and the color filter substrate in the region of the reflective electrode is substantially uniform.

16. A liquid crystal display device A liquid crystal display device which sandwiches liquid crystal between a TFT substrate and a color filter substrate and forms an image by applying an electric field to the liquid crystal, wherein data lines which extend in the first direction and are arranged parallel to each other in the second direction and scanning lines which extend in the second direction and are arranged parallel to each other in the first direction are formed on the TFT substrate, pixel portions are formed in portions which are surrounded by the data lines and the scanning lines, a reflective electrode having unevenness and a common electrode which is brought into contact with the reflective electrode are formed on the pixel portion, an insulation film is formed on the common electrode, a pixel electrode is formed on the insulation film, and a voltage is applied to the pixel electrode and the common electrode so as to control liquid crystal molecules; and the common electrode is formed of a coating-type transparent conductive film; and the common electrode which is brought into contact with the reflective electrode having the unevenness is formed of the coating-type transparent conductive film so that a surface of the common electrode facing the liquid crystal in a region of the reflective electrode facing the liquid crystal is substantially level without the unevenness of the reflective electrode.

17. A liquid crystal display device according to claim 16, wherein the coating-type transparent conductive film is made of ITO.

18. A liquid crystal display device according to claim 16, wherein the coating-type transparent conductive film is made of ZnO.

19. A liquid crystal display device according to claim 16, wherein the coating-type transparent conductive film is made of poly-aniline or polyethylene-dihydroxy-thiophene.

20. A liquid crystal display device according to claim 16, wherein the reflective electrode is formed of a two-layered metal film consisting of an upper-layer metal film and a lower-layer metal film, and both of the upper-layer metal film and the lower-layer metal film are in contact with the common electrode.

21. A liquid crystal display device according to claim 20, wherein the upper-layer metal film is made of Al or Al alloy and the lower-layer metal film is made of Mo or Mo alloy.

22. A liquid crystal display device according to claim 16, wherein a cell gap of the liquid crystal between the TFT substrate and the color filter substrate in the region of the reflective electrode is substantially uniform.

* * * * *